United States Patent
Schlanger et al.

(10) Patent No.: US 9,530,300 B1
(45) Date of Patent: Dec. 27, 2016

(54) HAND-HELD RADIATION DETECTOR

(71) Applicants: William Schlanger, Palm Springs, CA (US); Benito Lizardi, Palm Springs, CA (US)

(72) Inventors: William Schlanger, Palm Springs, CA (US); Benito Lizardi, Palm Springs, CA (US)

(*) Notice: Subject to any disclaimer, the term of this patent is extended or adjusted under 35 U.S.C. 154(b) by 256 days.

(21) Appl. No.: 14/035,941

(22) Filed: Sep. 24, 2013

Related U.S. Application Data (60) Provisional application No. 61/705,078, filed on Sep. 24, 2012.

(51) Int. Cl.
*G01T 1/16* (2006.01)
*G08B 21/18* (2006.01)

(52) U.S. Cl.
CPC .............. *G08B 21/18* (2013.01); *G01T 1/16* (2013.01)

(58) Field of Classification Search
CPC .............. G01T 7/00; G01T 7/02; G01T 1/00; G01T 1/14; G01T 1/16
USPC ............. 250/364, 380, 304; 340/600, 539.29
See application file for complete search history.

(56) References Cited

U.S. PATENT DOCUMENTS

| | | | |
|---|---|---|---|
| 3,056,886 A | 10/1962 | Glaude et al. | |
| 3,084,255 A * | 4/1963 | Brinkerhoff | G01T 7/02 250/380 |
| 3,968,371 A | 7/1976 | Greendale | |
| 3,984,690 A * | 10/1976 | Marshall, III | G01T 1/185 250/336.1 |
| 4,104,523 A * | 8/1978 | Wolfert | G01T 1/178 250/255 |
| 4,381,450 A * | 4/1983 | Cappelli | G01T 1/026 250/370.07 |
| 4,391,676 A * | 7/1983 | Torberger | B01D 61/362 159/17.1 |
| 4,801,803 A * | 1/1989 | Denen | A61B 6/425 250/336.1 |
| 5,047,634 A * | 9/1991 | Guelin | G01T 1/178 250/255 |
| 5,132,543 A | 7/1992 | Valentine et al. | |
| 5,218,208 A * | 6/1993 | Augier | G01T 7/00 250/363.01 |
| 6,272,373 B1 * | 8/2001 | Bouton | A61B 6/4258 250/336.1 |
| 6,288,400 B1 | 9/2001 | Negro | |

(Continued)

*Primary Examiner* — Albert Wong
(74) *Attorney, Agent, or Firm* — Invention to Patent Services; Alex Hobson (57) ABSTRACT

A hand-held radiation detector that produces a voltage as a function of the amount of ionizing radiation is described. The hand-held radiation detector may be configured for measuring low levels of ionizing radiation including alpha radiation. A light alert feature may blink and/or a sound alert feature may produce a bird chirping sound at a frequency relative to the amount of radiation detected. The ionizing radiation detector may have an ion chamber comprising a first electrode chamber and a second electrode configured inside the first electrode chamber, and it may be an open type ion chamber allowing ambient air to enter the ion chamber. A sensitivity range selector may be used to increase or decrease the voltage range for detection. An input selector may be used to select the type of detection a user desires, such as consumables or radon gas for example.

18 Claims, 5 Drawing Sheets

(56) References Cited

U.S. PATENT DOCUMENTS

| | | | |
|---|---|---|---|
| 7,126,121 B1 * | 10/2006 | McGlothlin | G01T 1/18 250/336.1 |
| 7,465,925 B2 * | 12/2008 | Antanouski | G01T 1/02 250/336.1 |
| 8,211,715 B1 * | 7/2012 | Royds | G01N 33/569 340/572.1 |
| 2004/0251422 A1 * | 12/2004 | Overhoff | G01T 1/185 250/376 |
| 2005/0127300 A1 | 6/2005 | Bordynuik | |
| 2007/0238138 A1 * | 10/2007 | Royds | G01N 33/54366 435/7.31 |
| 2007/0295904 A1 | 12/2007 | Antanouski | |
| 2009/0078882 A1 | 3/2009 | Unfors | |
| 2011/0017914 A1 | 1/2011 | Flamanc et al. | |
| 2011/0155909 A1 * | 6/2011 | Frank | G01T 1/36 250/336.1 |
| 2012/0126988 A1 | 5/2012 | Kaplan | |

* cited by examiner

HAND-HELD RADIATION DETECTOR

CROSS REFERENCE TO RELATED APPLICATIONS

This application claims benefit of U.S. provisional patent application No. 61/705,078, filed on Sep. 24, 2012, and entitled Hand-Held Radiation Detector, which is incorporated herein by reference.

BACKGROUND OF THE INVENTION

Field of the Invention

The present invention relates to a hand-held ionizing radiation detector that has an alerting feature having an alerting frequency that is relative to the amount of ionization radiation detected.

Background

The public is becoming increasing aware of potential radiation hazards including radiation contamination of food and household items as well as the threat of radon gas in their homes or workplace. Nuclear disasters, such as the Fukushima disaster in Japan, has made the public concerned about contamination of food products, such as produce. Furthermore, there are threats of "dirty bombs" that can produce radiation over a broad area and the public may want to be assured that they have evacuated to a safe location, free of radiation.

While there may be radiation detectors available, they are typically very expensive, not configured to be hand held and not configured for public use. Most radiation detectors are configured for higher energy type radiation, such as gamma and beta radiation, and are not configured to be sensitive to the type of radiation that most people in the public might encounter, such as alpha radiation.

There is a need for a hand-held ionizing radiation detector that is low cost, simple to operate, and discreet, whereby the alerting feature does not draw attention to the detector.

SUMMARY OF THE INVENTION

The invention is directed to a hand-held radiation detector that produces a voltage as a function of the amount of ionizing radiation. In an exemplary embodiment, the hand-held radiation detector is configured for measuring low levels ionizing radiation including alpha radiation. The ionizing radiation detector may have any suitable configuration, including an ion chamber comprising a first electrode chamber and a second electrode configured inside said first electrode chamber. The second electrode may be a rod that is substantially centered along the length axis of the first electrode chamber in a coaxial electrode arrangement. The first electrode chamber may be a cylinder having a circular cross-sectional shape, an inner diameter and outer diameter. The first electrode chamber may have any suitable cross-sectional shape, however. The first electrode chamber or second electrode may be charged by the control circuit. In an exemplary embodiment, the first electrode chamber is charged. The ion chamber may be an open type, wherein the first electrode chamber has at least one opening, such as an open end, whereby ambient air may enter the chamber. In one embodiment, both ends of the ion chamber are open. A fan may be configured to move air into the first electrode chamber in an open type ionizing radiation detector. In another embodiment, the ion chamber is a closed type, wherein the interior volume of the first electrode chamber is sealed to the outside ambient air and comprises at least one window, whereby ionizing radiation may enter the chamber. A window is made of a material that is preferably transparent to ionizing radiation and may include glass or mica.

The hand-held radiation detector described herein comprises a control circuit that is connected to an audible type alert feature, whereby the audible type alert feature emits a sound having a frequency that, in one embodiment, corresponds to the voltage measured. Furthermore, in an exemplary embodiment, the control circuit establishes a baseline voltage when the hand-held radiation detector is turned on. A baseline voltage is important with an open type ion chamber as the ambient environment, including humidity level, air borne particles and the like, can influence the voltage measurement. The relative increase in the voltage measured from the baseline voltage may be used to control an alerting feature, such as audible or light alert feature. The frequency or intensity of an alerting feature may be a function of the voltage measured. For example, an audible alert feature may be configured to produce a bird chirping sound, that chirps at a frequency relative to the voltage measured; faster at higher voltages and slower at lower voltages. The bird chirping sound may also grow intensity or volume as a function of the radiation level detected. Likewise, a light alert feature may blink, turn on and off or change intensity at a frequency relative to the measured voltage. Any suitable type of audible type alert feature may be used, including a beep, click or bird chirping sound. In some cases, a person may use the hand-held radiation detector described herein in public places and they may want to be discreet when using the device. A bird chirping audible type alert feature may draw less attention than a click or beeping sound. In addition, a person may utilize the light alert feature only, to be even more discreet.

The hand-held radiation detector described herein may have any number of user input controls and selectors, including a volume control, a sensitivity range selector, an input selector and the like. Any suitable type of processor, such as a microprocessor may be used to control the hand-held radiation detector described herein. The volume control may be used to increase or decrease the volume of the audible alert feature. The sensitivity range selector may be used to increase or decrease the sensitivity of the detector, or the voltage level for detection. For example, a person may select a higher sensitivity range, whereby a lower measured voltage produces a higher frequency or intensity alert than when the detector is set to a lower sensitivity range. The hand-held radiation detector, as described herein, may comprise an input selector, whereby a person can select the type of item or area to be inspected. For example, a plurality of input selections may be provided to the user including, but not limited to, consumables (e.g. food or beverage products such as produce or meats), radon gas, toys or plastics, radioactive hydrocarbons, etc. The hand-held radiation detector described herein may further comprise a safety level indicator, such as a light or a display feature on a display screen. The safety level indicator may correspond to an input selector setting. For example, if a user selects produce as an input selection, the safety level indicator may alert the user if the voltage measured indicates an unsafe level of radiation for produce.

The hand-held radiation detector may comprise a display screen, such as a liquid crystal display (LCD) screen. The display screen may display the voltage measured or display inputs set by the user, such as volume, sensitivity range, and input selector. For example, a person may use one or more buttons, such as up and down arrows to change the sensitivity range or volume and this may be indicated on the display. The safety level indicator may also be displayed on the display screen or may be a separate light feature.

The hand-held radiation detector described herein may be configured for measuring low energy type radiation, including, but not limited to, alpha particles and radon gas; the type of radiation that most people may be exposed to.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale; some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for the purposes of illustrating the present invention and should not be interpreted as limiting the scope of the invention. Other embodiments of the invention, and certain modifications, combinations and improvements of the described embodiments will occur to those skilled in the art and all such alternate embodiments, combinations, modifications, and improvements are within the scope of the present invention.

Figure 1A:
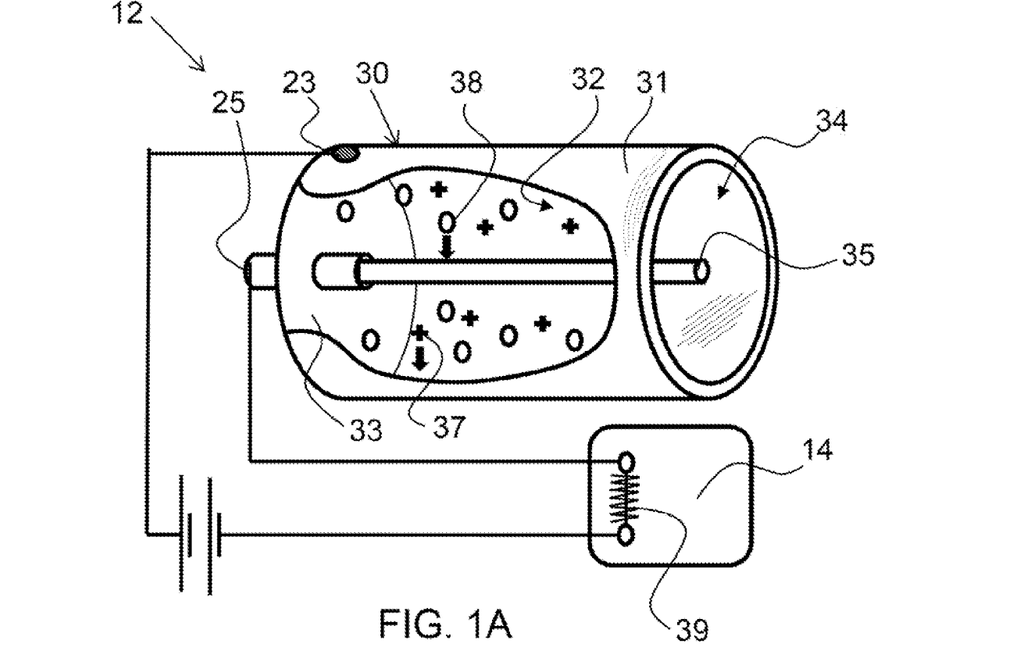
FIG. 1A shows an isometric view of an exemplary ionizing radiation detector described herein having a partial cut-away section to show the interior of the first electrode chamber.

FIG. 1A shows an isometric view of an exemplary ionizing radiation detector 12 described herein having a partial cut-away section of the ion chamber 30 to show the interior of the first electrode chamber 31. The first electrode chamber 31 is a cylinder having an inside surface 32 whereby ions, such as positive ions 37 may discharge. The second electrode 35 is a rod configured substantially centered along the length axis of the first electrode chamber 31. Negative ions 38 may discharge on the second electrode. The first electrode chamber may be negatively charged, thereby attracting the positive ions. The ion chamber 30 shown in FIG. 1A has one sealed end 33 that may be electrically conductive or substantially block radiation from entering the interior volume of the ion chamber 30, and a window 34 that is substantially transparent to radiation. The ion chamber 30 shown in FIG. 1A is a closed type, whereby ambient air does not enter the chamber. Radiation may enter through the window and create ions 37, 38 that are drawn to and discharge on the electrodes. The discharge of the ions on the electrodes creates a current that is passed through a resistor 39 and a voltage is measured by the control circuit 14. The more ions that discharge on the electrodes, the higher the voltage measured. The control circuit is connected to the ion chamber by contacts 25 and 23 on the electrodes.

In an exemplary embodiment the hand-held radiation detector described herein is configured to detect alpha particles. Alpha particles ionize the oxygen and nitrogen atoms of the air in the ion chamber. Ionize, as used herein, means to "knock an electron off of." When an electron is knocked off of an atom a free electron (with a negative charge) is produced and an atom missing one electron (with a positive charge) is produced. As shown in FIG. 1, the negative electron 38 is attracted to the first second electrode 35, or the rod configured with the ion chamber 30. The positive atom 37 is attracted to the inside surface 32 of the first electrode chamber 31 having a negative voltage. The control circuit is configured to sense the small amount of electrical current that these electrons and ions moving toward the electrodes represent.

Figure 1B:
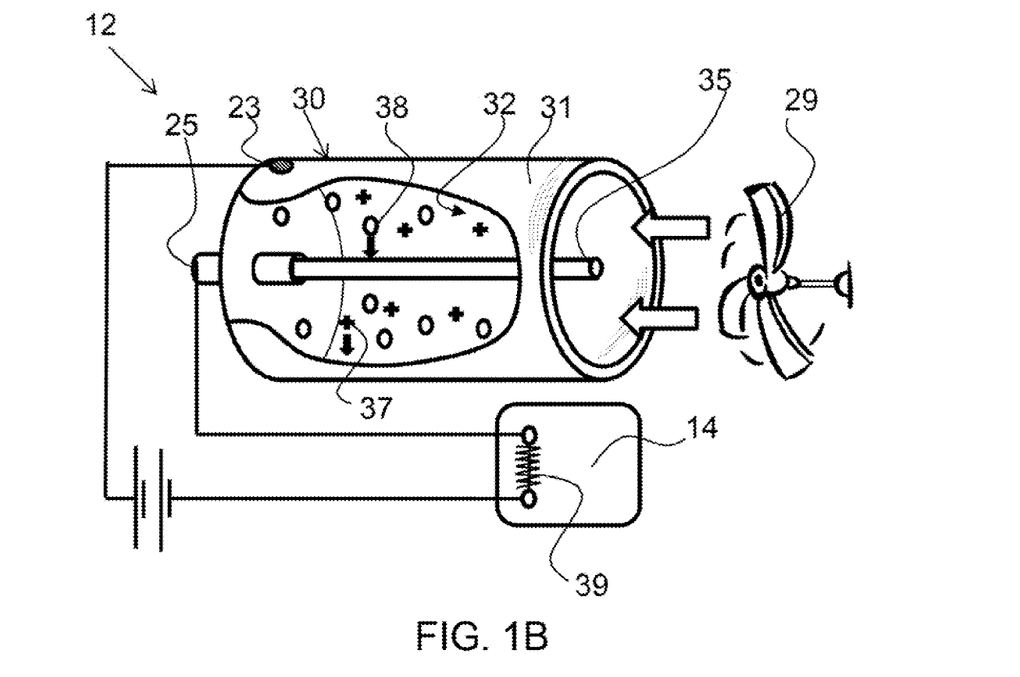
FIG. 1B shows an isometric view of an exemplary ionizing radiation detector described herein having a partial cut-away section to show the interior of the first electrode chamber and a fan configured at the open end of the first electrode chamber.

FIG. 1B shows an isometric view of an exemplary ionizing radiation detector 12 described herein having a partial cut-away section to show the interior of the first electrode chamber 31 and a fan 29 configured at the open end of the ion chamber 30. In this exemplary embodiment, ambient air may enter into the interior volume of the ion chamber 30. Some radiation, such as alpha radiation, may be substantially blocked or consumed by a window 35 thereby making an open type ion chamber more effective for measuring this lower energy type of radiation. A fan 29 is shown configured over the open end of the ion chamber 30 but may be configured in any suitable location to increase airflow, as indicated by the arrow in FIG. 1B, into the ion chamber.

Figure 2:
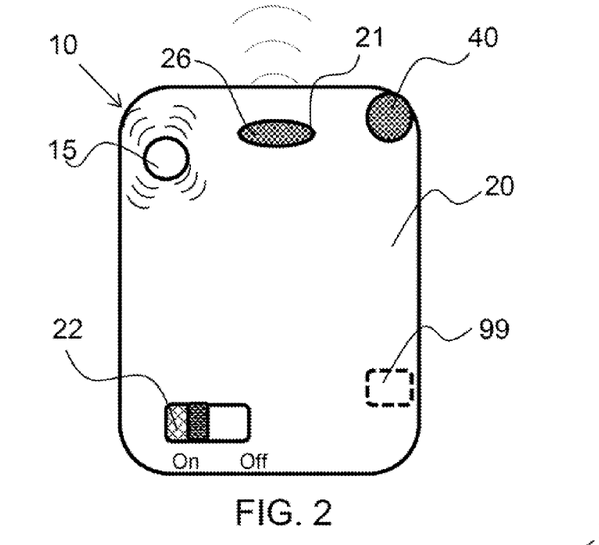
FIG. 2 shows a front view of an exemplary hand-held radiation detector described herein.

FIG. 2 shows a front view of an exemplary hand-held radiation detector 10 described herein. The hand-held radiation detector 10 shown in FIG. 1 comprises an audible alert feature 21 and a light alert feature 15. The audible alert feature shown in FIG. 2 is a piezoelectric transducer type 26, but may also be an electromagnetic loud speaker. The housing 20 of the hand-held radiation detector 10 encloses the ionizing radiation detector and has an opening 40 to allow ionizing radiation to enter into the ion chamber, not shown. The hand-held radiation detector 10 also comprise an on/off feature 22. A micro-processor 99, as indicated by the dashed lines, is shown being configured within the interior of the hand-held radiation detector 10.

Figure 3:
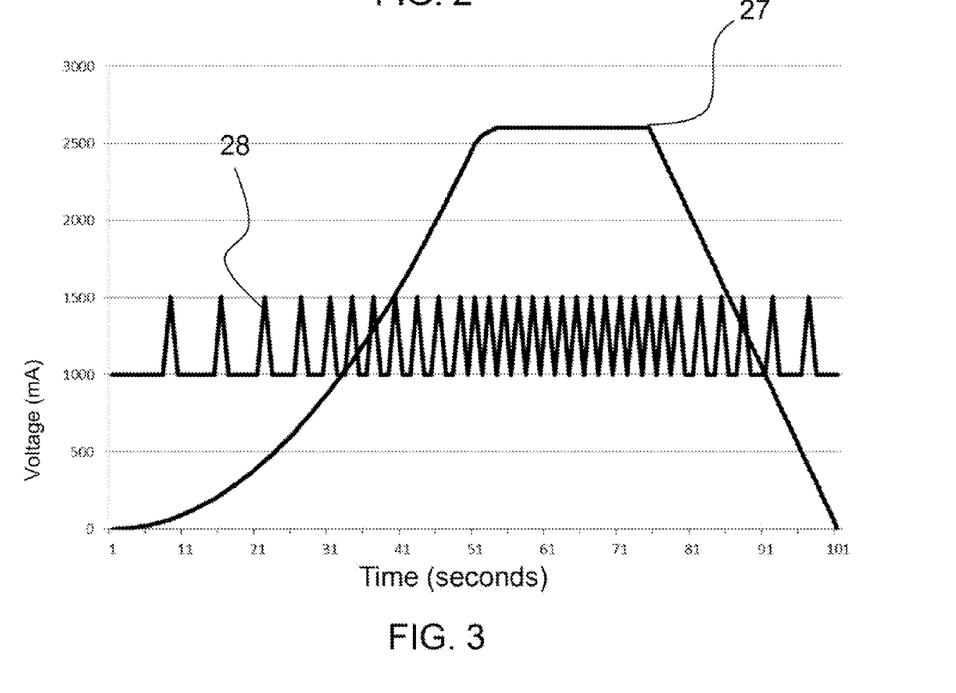
FIG. 3 shows a chart of the frequency of an alerting feature as a function of voltage measured by the hand-held radiation detector described herein.

FIG. 3 shows a chart of the frequency 28 of an audible alert feature as a function of measured voltage 27 by the hand-held radiation detector described herein. As shown in FIG. 3, the frequency of the sound emitted by the audible alert feature is initially low and as the measured voltage 27 increase, the frequency increases until it is at a maximum frequency. When the measured voltage 27 decreases, the frequency of the sound emitted by the audible alert feature decreases.

Figure 4:
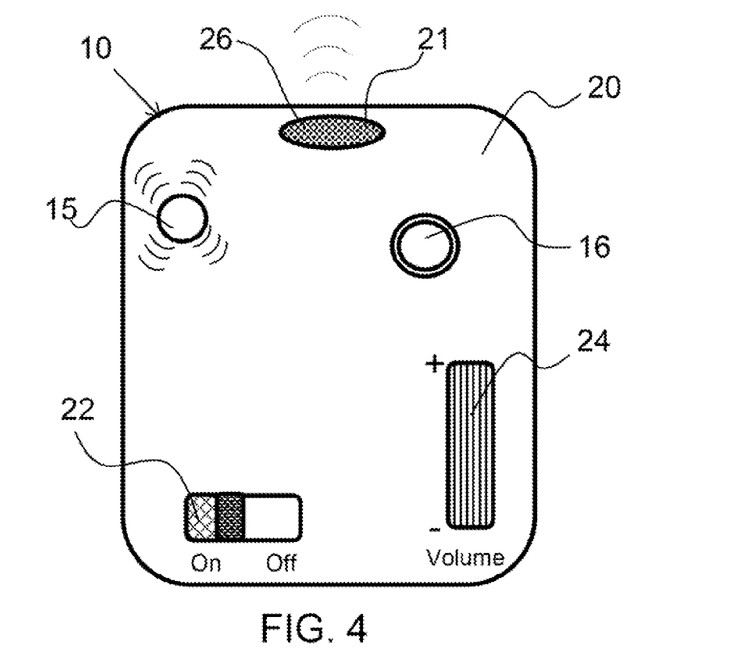
FIG. 4 shows a front view of an exemplary hand-held radiation detector described herein having a sensitivity range selector.

FIG. 4 shows a front view of an exemplary hand-held radiation detector 10 described herein having a sensitivity range selector 16, and a volume control 24. The sensitivity range selector may be used to increase or decrease the sensitivity of the ionizing radiation detector 12, not shown. The sensitivity range selector may be a single button or may comprise two or more buttons, such as an up and down input button.

Figure 5:
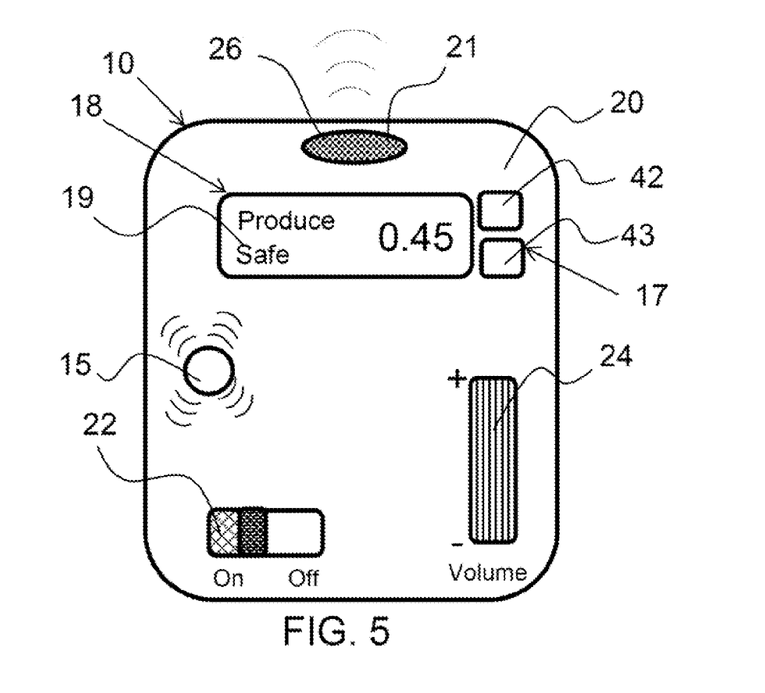
FIG. 5 shows a front view of an exemplary hand-held radiation detector described herein having a display screen.

FIG. 5 shows a front view of an exemplary hand-held radiation detector 10 described herein having a display screen 18 and a first 42 and second 43 interface feature. In addition, an input selector 17 is shown being configured for input by the first and second interface feature. As shown in FIG. 5, the display screen indicates that an input selected in produce. In addition, a safety indicator 19 is shown indicating that the radiation level measured, a value of 0.45 volts, as shown on the display screen, is safe. In one embodiment, a voltage may be converted into rads of radiation.

Figure 6:
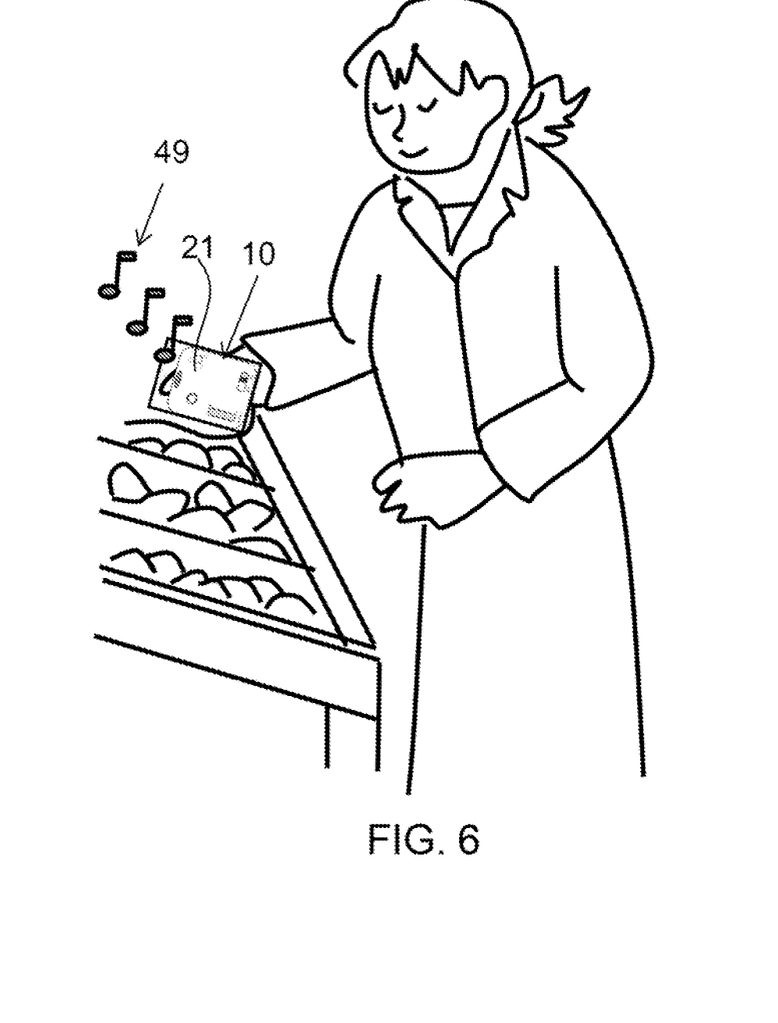
FIG. 6 shows a depiction of a person inspecting produce with an exemplary hand-held radiation detector described herein.

FIG. 6 shows a depiction of a person inspecting produce with an exemplary hand-held radiation detector 10 described herein. The audible alert feature 21 is shown producing a bird chirping sound 49.

Figure 7:
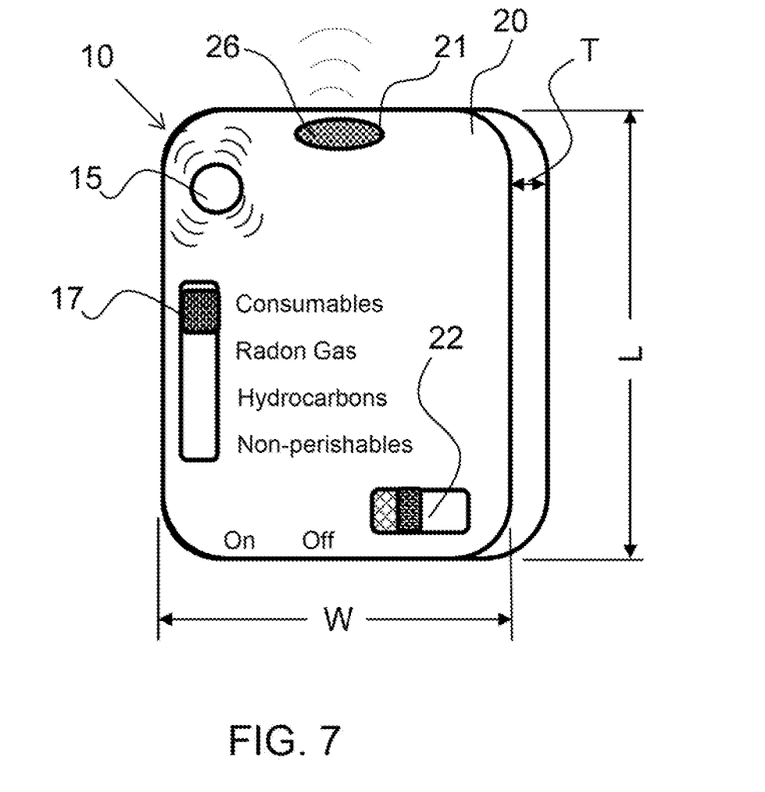
FIG. 7 shows an isometric front view of an exemplary hand-held radiation detector described herein.

FIG. 7 shows an isometric front view of an exemplary hand-held radiation detector 10 described herein having a length L, width W and thickness T. As described herein, the hand-held radiation detector may be configured to be held and operated in one hand. The hand-held radiation detector may be configured to have all size dimensions including length, width, and thickness no more than about 20 cm, no more than about 15 cm, no more than about 10 cm, no more than about 8 cm and any range between and including the dimensions provided. In an exemplary embodiment, the hand-held radiation detector described herein, has a length, width and thickness of approximately 55 mm, 35 mm and 15 mm respectively. In one embodiment, the hand-held radiation detector described herein is integral, meaning that it is contained completely within the housing 20, and that there are no extensions, such as hoses or detectors that extend from the housing. Also shown in FIG. 7 is an input selector 17 having a plurality of input selections for a person to select. The input selector is set to consumables, whereby the voltage range is automatically set to detect radiation emitted by consumables, such as produce.

DEFINITIONS

Ionizing radiation, as used herein, means any radiation composed of particles that individually carry enough energy to liberate an electron from an atom or molecule without raising the bulk material to ionization potential and includes, but is not limited to, cosmic rays, alpha, beta and gamma rays, X-rays, and in general any charged particle moving at relativistic speeds.

Ion chamber, as used herein, is a chamber comprising an electrode configured around an opposing electrode, such as a coaxial electrode arrangement, wherein a rod or wire is configured inside of and substantially centered along the length axis of a cylinder. In one embodiment, the ion chamber is an open type, wherein the chamber is open to the atmosphere and not sealed, thereby allowing weak ionizing radiation to freely enter the chamber. In another embodiment, the ion chamber is a closed type, comprising a window made of a material that is substantially transparent to the ionization radiation. A window may be made out of any suitable material including glass or mica and the like.

Hand-held, as used herein in reference to the radiation detector, means that the radiation detector is of a size that can be carried in a person's hand and may have all size dimensions including length, width, and thickness no more than about 20 cm, no more than about 15 cm, no more than about 10 cm, no more than about 8 cm.

Sensitivity range selector, as used herein, is defined as a user input for changing the sensitivity of the detector, that thereby changes the alert feature response, such as alerting feature frequency, as a function of the amount of ionization radiation detected, the voltage measured and the sensitivity setting selected. For example, a user may select a lower sensitivity range for inspecting produce, where the ionization radiation is relatively low, thereby producing a low voltage and then increase the sensitivity range when inspecting a basement with radon gas that has a much higher level of ionization radiation than the produce.

Input selector, as used herein, is defined as a user input for selecting the type of item or area to be inspected. For example, a plurality of input selections may be provided to the user including, but not limited to, consumables (e.g. food or beverage products such as produce or meats), radon gas, toys or plastics, radioactive hydrocarbons, etc.

Light alert feature, as used herein, is defined as any light emitting article that can be controlled by an electrical input including, but not limited to, an incandescent light, a fluorescent light, a light emitting diode (LED), and the like.

Audible alert feature, as used herein, is a type of alerting feature that produces an audible sound and may comprise any suitable type or combination of devices including, but not limited to, an electromagnetic loud speaker, a piezoelectric transducer and the like.

Safety level indicator, as used herein, is defined as a light, or a symbol in a display screen that indicates if the amount of ionization radiation is within a safe level and/or when the amount of ionization radiation exceeds an unsafe level. The level used for the determination of safe or potentially hazardous or unsafe, may be determined by the user input selection. For example, the amount of radiation that is determined to be safe when measuring radon gas in a basement may be different from the amount of ionization radiation measured from produce.

Bird chirp sound, as used herein, is defined as a sound that resembles a bird chirping and/or singing and may draw less attention to the radiation detector than a beep or clicking sound.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A hand-held alpha radiation detector comprising:
   a) an ionizing radiation detector comprising:
      a single ion chamber comprising:
         a first electrode chamber;
         a second electrode configured inside and coaxial with said first electrode chamber;
      wherein a circuit couples the first electrode with the second electrode and a resistor along said circuit produces a voltage that is a function of an amount of ionizing radiation within the ion chamber;
   b) an audible alert feature;
      wherein the audible alert emits a sound when an unsafe level of radiation is detected for an input selection selected on the hand-held-alpha radiation detector; and whereby the audible alert feature emits a sound having a frequency that corresponds to said voltage;
   c) a food products input selector;
      wherein said audible alert feature emits said sound when an unsafe level of alpha radiation is detected for food products;
   d) a radon gas input selector;
      wherein said audible alert feature emits said sound when an unsafe level of alpha radiation is detected for radon gas;
   wherein the hand-held alpha radiation detector is of a size that can be carried in a person's hand; wherein all dimensions of the hand-held alpha radiation detector including a length, a width, and a thickness are each no more than 20 cm
   wherein a baseline voltage is produced when the hand-held alpha radiation detector is turned on and held in an ambient environment.

2. The hand-held alpha radiation detector of claim 1, wherein the first electrode chamber is charged.

3. The hand-held alpha radiation detector of claim 2, wherein the first electrode chamber is a cylinder having a length axis and the second electrode is a rod configured coaxial with said first electrode along the length axis.

4. The hand-held alpha radiation detector of claim 3, wherein the ion chamber is an open type ion chamber wherein the cylinder has an open end for receiving a flow of air into said first electrode chamber.

5. The hand-held alpha radiation detector of claim 4, further comprising a fan, wherein said fan is configured to move air into the cylinder of the first electrode chamber.

6. The hand-held alpha radiation detector of claim 1, wherein the audible alert feature emits a bird chirp sound.

7. The hand-held alpha radiation detector of claim 1, further comprising a volume control that is coupled with the audible alert feature and configured to change a volume of sound emitted by the audible alert feature.

8. The hand-held alpha radiation detector of claim 1, further comprising a light alert feature configured to emit a light to indicate a measured voltage level.

9. The hand-held alpha radiation detector of claim 8, wherein the light alert feature blinks at a frequency that corresponds to said measured voltage level.

10. The hand-held alpha radiation detector of claim 1, further comprising a sensitivity range selector that is configured to increase or decrease a detection voltage level of the hand-held alpha radiation detector.

11. The hand-held alpha radiation detector of claim 1, wherein said input selector comprises a plurality of input selections including:
   a) said food products input selection;
   b) said radon gas input selection; and
   c) a plastic input selection.

12. The hand-held alpha radiation detector of claim 11, wherein the audible alert emits a sound when an unsafe level of radiation is detected for the input selection selected on the hand-held-alpha radiation detector.

13. The hand-held alpha radiation detector of claim 1, further comprising a display screen configured to display the amount of radiation.

14. The hand-held alpha radiation detector of claim 1, further comprising a safety level indicator.

15. The hand-held alpha radiation detector of claim 14, wherein the safety level indicator is configured on a display screen.

16. The hand-held alpha radiation detector of claim 14, wherein the safety level indicator is configured to indicate that an unsafe level of radiation is detected for food products.

17. A hand-held alpha radiation detector comprising:
   a) an ionizing radiation detector comprising:
      an ion chamber having a coaxial electrode arrangement comprising:
         1. a first cylinder shaped electrode chamber having a length axis;
         2. a second rod shaped electrode configured inside and coaxial with said first electrode chamber;
      wherein a circuit couples the first electrode with the second electrode and a resistor along said circuit produces a voltage that is a function of an amount of ionizing radiation within the ion chamber;
   b) a fan configured to move air into the first electrode chamber;
   c) an audible alert feature;
      whereby the audible alert feature emits a sound having a frequency that corresponds to said voltage;
   d) a food products input selector;
      wherein said audible alert feature emits said sound when an unsafe level of radiation is detected for food products;
   e) a radon gas input selector;
      wherein said audible alert feature emits said sound when an unsafe level of alpha radiation is detected for radon gas;
   wherein the ion chamber is an open type ion chamber,
   wherein a baseline voltage is produced when the hand-held alpha radiation detector is turned on and held in an ambient environment,
   wherein the audible alert feature emits a sound having a frequency that corresponds to said voltage,
   wherein the audible alert feature emits a bird chirp sound; and
   wherein the hand-held alpha radiation detector is of a size that can be carried in a person's hand; wherein all dimensions of the hand-held alpha radiation detector including a length, a width, and a thickness are each no more than 20 cm.

18. The hand-held alpha radiation detector of claim 17, wherein the first electrode chamber is a cylinder having a length axis and the second electrode is a rod configured coaxial with said first electrode along the length axis;
   wherein the ion chamber is an open type ion chamber wherein the cylinder has an open end for receiving a flow of air into said first electrode chamber; and further comprising a fan,
wherein said fan is configured to move air into the cylinder of the first electrode chamber.

* * * * *